(12) United States Patent  
Chacko et al.

(10) Patent No.: US 11,043,334 B2  
(45) Date of Patent: Jun. 22, 2021

(54) MICROPATTERNED ANODE AND CATHODE SURFACE FOR ADHESION AND RELIABILITY

(71) Applicant: KEMET Electronics Corporation, Ft. Lauderdale, FL (US)

(72) Inventors: Antony P. Chacko, Simpsonville, SC (US); Christian L. Guerrero, Simpsonville, SC (US); John Joseph Ols, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 33 days.

(21) Appl. No.: 16/784,610

(22) Filed: Feb. 7, 2020

(65) Prior Publication Data

US 2020/0273627 A1  Aug. 27, 2020

Related U.S. Application Data

(60) Provisional application No. 62/811,374, filed on Feb. 27, 2019.

(51) Int. Cl.
| | | |
|---|---|---|
| *H01G 9/052* | (2006.01) | |
| *H01G 9/042* | (2006.01) | |
| *H01G 9/00* | (2006.01) | |
| *H01G 11/48* | (2013.01) | |
| *H01G 9/15* | (2006.01) | |
| *H01G 9/04* | (2006.01) | |

(52) U.S. Cl.
CPC ......... *H01G 9/0525* (2013.01); *H01G 9/0036* (2013.01); *H01G 9/0425* (2013.01); *H01G 9/15* (2013.01); *H01G 11/48* (2013.01); *H01G 2009/05* (2013.01)

(58) Field of Classification Search
None
See application file for complete search history.

(56) References Cited

U.S. PATENT DOCUMENTS

| 3,345,545 | A | * | 10/1967 | Bourgault | H01G 9/052 |
|---|---|---|---|---|---|
| | | | | | 361/529 |
| 6,191,936 | B1 | * | 2/2001 | Webber | H01G 9/052 |
| | | | | | 361/524 |
| 7,154,742 | B1 | * | 12/2006 | Hahn | H01G 9/048 |
| | | | | | 361/528 |
| 7,342,775 | B2 | * | 3/2008 | Hahn | H01G 9/012 |
| | | | | | 361/528 |
| 10,079,115 | B2 | | 9/2018 | Djebara et al. | |
| 2013/0242467 | A1 | * | 9/2013 | Biler | C09D 5/4476 |
| | | | | | 361/504 |

(Continued)

*Primary Examiner* — Dion Ferguson  
(74) *Attorney, Agent, or Firm* — Joseph T. Guy; Patent Filing Specialist Inc.

(57) ABSTRACT

An improved capacitor is provided. The capacitor comprises an anode comprising a pressed and sintered, preferably tantalum, powder wherein the anode has edge surfaces and parallel major surfaces. The anode further comprises a first set of parallel surface protrusions and a second set of parallel surface protrusions on each parallel major surface wherein the first set of parallel surface protrusions and second set of parallel surface protrusions are not parallel and form a well therebetween. An anode wire extends from an edge surface of the edge surfaces. A dielectric is on the anode and a conductive polymer on said dielectric.

25 Claims, 6 Drawing Sheets

(56) References Cited

U.S. PATENT DOCUMENTS

2014/0233157 A1\* 8/2014 Hahn .................. H01G 9/0425
361/528
2014/0321029 A1\* 10/2014 Djebara ................ H01G 9/028
361/525

\* cited by examiner

MICROPATTERNED ANODE AND CATHODE SURFACE FOR ADHESION AND RELIABILITY

CROSS-REFERENCE TO RELATED APPLICATIONS

The present invention claims priority to U.S. Provisional Patent Application No. 62/811,374 filed Feb. 27, 2019 which is incorporated herein by reference.

BACKGROUND

The present invention is related to the formation of solid electrolytic capacitors comprising a micropatterned surface. More specifically, the present invention is related to solid electrolytic capacitors formed from a high charge density powder, which allows for a very thin anode, wherein at least one of the anode or cathode are micropatterned to improve adhesion between layers without loss of capacitance.

There has been an ongoing desire in modern electronics to provide increased electrical functionality in a smaller package. This trend, referred to in the art as miniaturization, extends to the individual electronic components wherein each component is required to provide more functionality within a decreased volume. Of utmost importance herein are solid electrolytic capacitors wherein there is an ongoing desire to increase the capacitance, per unit volume, without detrimentally impacting other attributes such as equivalent series resistance (ESR), inductance or other electrical characteristics.

There have been two major developments in solid electrolytic capacitors in recent decades. One development has been in the replacement of manganese dioxide by conductive polymeric materials, and especially conductive thiophene based conductive polymeric materials, as the cathode. The other advance has come in the form of improved valve metal powders, particularly tantalum, wherein the charge density of the powders can now exceed 200,000 $\mu FV/g$. The high charge density allows for a decrease in anode volume, particularly anode thickness, at a given capacitance. While desirable this increased capacitance, for a given volume, has placed a significant burden on the interface between the conductive polymer and anode surface.

Charge density is largely a function of surface area and therefore a higher charge density powder comprises smaller sintered particles within the pressed anode. The smaller particles have less surface area available for adhesion of the conductive polymer which leads to an increase in defects related to poor adhesion of the conductive polymer to the surface of the dielectric of the anode. This is not a problem with manganese dioxide as the cathode. With conductive polymer cathodes the problem has severely limited the use of small capacitors utilizing the high charge density powders, particularly in thin capacitors, with conductive polymer cathodes.

U.S. Pat. No. 10,079,115 attempts to resolve the adhesion problem by utilizing notches across the face of the anode body. The notches allow effective drainage of the conductive polymer, carbonaceous layer and metal layer during manufacturing thereby mitigating the formation of polymer bridging. While advantageous with large anodes, and relatively large particle sizes, as the particle size decreases further and the anode decreases in size, and particularly in thickness, the formation of notches is detrimental as the additional structural perturbation tends to cause weak areas which facilitate anode breakage and physical instability.

Provided herein is an improved solid electrolytic capacitor. The improved solid electrolytic capacitor is capable of taking advantage of high charge density powders, particularly at small thicknesses, without delamination of those layers taken together to form a cathode including conductive polymer layers, carbon containing layers and metal containing layers. More particularly, the present invention provides an improved anode or cathode for use in the improved solid electrolytic capacitor.

SUMMARY OF THE INVENTION

The invention is related to an improved capacitor, and process for making an improved capacitor, wherein the anode or cathode of the capacitor has micropatterning which allows for the synergistic use of high charge density powders and conductive polymeric cathodes.

A particular feature of the invention is the ability to withstand manufacturing and use without deterioration of the bond between the dielectric and cathode or between adjacent cathode layers.

A particular advantage is the ability to manufacture the capacitor, and particularly the anode or cathode of the capacitor, using conventional equipment.

These and other embodiments, as will be realized, are provided in a capacitor. The capacitor comprises an anode comprising a pressed and sintered valve metal, preferably tantalum, powder wherein the anode has edge surfaces and parallel major surfaces. The anode further comprises a first set of parallel surface protrusions and a second set of parallel surface protrusions on each parallel major surface wherein the first set of parallel surface protrusions and second set of parallel surface protrusions are not parallel to each other and form a well therebetween. An anode wire extends from an edge surface of the edge surfaces. A dielectric is on the anode and a conductive polymer on said dielectric.

Yet another embodiment is provided in a capacitor. The capacitor comprises an anode comprising a pressed and sintered valve metal, preferably tantalum, powder with a dielectric on the anode and a conductive polymer on the dielectric. The capacitor has edge surfaces and parallel major surfaces and comprises a first set of parallel surface protrusions and a second set of parallel surface protrusions on each parallel major surface. The first set of parallel surface protrusions and the second set of parallel surface protrusions are not parallel with each other and form a well therebetween. An anode wire extends from an edge surface.

Yet another embodiment is provided in a method for forming a capacitor. The method includes:
forming a monolith of a valve metal, preferably tantalum, comprising parallel major surfaces and edge surfaces with an anode wire extending from an edge surface wherein the monolith further comprises a first set of parallel surface protrusions and a second set of parallel surface protrusions on each parallel major surface wherein the first set of parallel surface protrusions and said second set of parallel surface protrusions are not parallel with each other and form a well therebetween;
sintering the monolith to form an anode;
forming a dielectric on the anode; and
forming a conductive polymer layer on the dielectric.

Yet another embodiment is provided in a method for forming a capacitor. The method includes:
charging a press with a valve metal, preferably tantalum, powder;
pressing the tantalum powder toから a monolith;
sintering the monolith to form an anode;

forming a dielectric on the anode;
forming a conductive polymer layer on the dielectric; and
forming a first set of parallel surface protrusions and a second set of parallel surface protrusions on parallel major surfaces of the conductive polymer layer wherein the first set of parallel surface protrusions and second set of parallel surface protrusions are not parallel with each other and form a well therebetween.

DESCRIPTION

The present invention is related to an improved solid cathode electrolytic capacitor comprising a high charge density powder and a cathode comprising conductive polymer on an anode made from high charge density powder. More specifically, the present invention comprises a micropatterned anode or cathode wherein the micropattern comprises a first set of parallel surface protrusions and a second set of parallel surface protrusions wherein the first set of parallel surface protrusions and second set of parallel surface protrusions are not parallel to each other. The micropattern allows for the formation of a cathode layer comprising conductive polymer in a capacitor having an anode comprising high charge density powder.

The invention will be described with reference to the figures forming an integral, non-limiting component of the disclosure. Throughout the description similar elements will be numbered accordingly.

Figure 1:
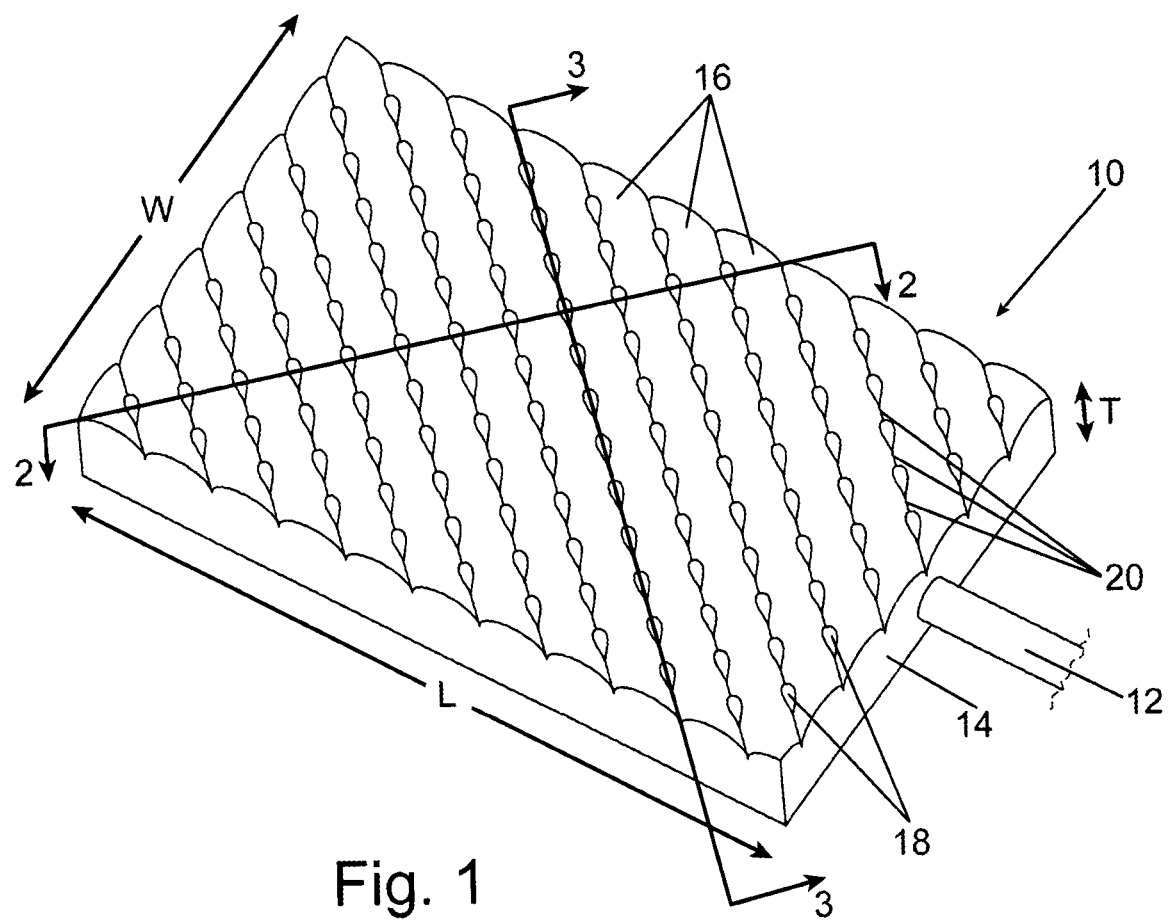
FIG. 1 is a top perspective schematic view of an embodiment of the invention.

An embodiment of the invention will be described with reference to FIG. 1 wherein a capacitor is illustrated schematically in top perspective view. In FIG. 1 the body of the capacitor, 10 has an anode wire, 12, extending therefrom. The anode wire may be attached to an edge surface, 14, or it may be, and preferably is, embedded in the anode with the anode formed by compressing a powder around the anode wire to form a monolithic body which is then sintered. The parallel major surfaces of the monolithic body comprise a micropattern with a first set of parallel surface protrusions, 16, and a second set of parallel surface protrusions, 18, wherein the first set of parallel surface protrusions and second set of parallel surface protrusions are not parallel to each other. A series of wells, 20, are formed on the surface wherein the wells are bound by intersecting surface protrusions. The surface protrusions may be formed on the anode with subsequent dielectric and cathode layers reproducing the surface protrusions thereby essentially replicating the surface protrusions on the surface of the capacitor. Alternatively, the surface protrusions may be formed in a cathode layer with subsequent cathode layers reproducing the surface protrusions thereby essentially replicating the surface protrusions on the surface of the capacitor.

The first set of parallel surface protrusions and second set of parallel surface protrusions are at an angle of at least about 25° relative to each other with an angle of about 90° being preferred. Below about 25° the wells formed are insufficient and approximate elongated notches which have proven to be ineffective with high charge density powders and conductive polymer cathode materials. It is preferable that the first set of parallel surface protrusions and second set of parallel surface protrusions are at an angle of at least about 45° relative to each other.

Figure 2:
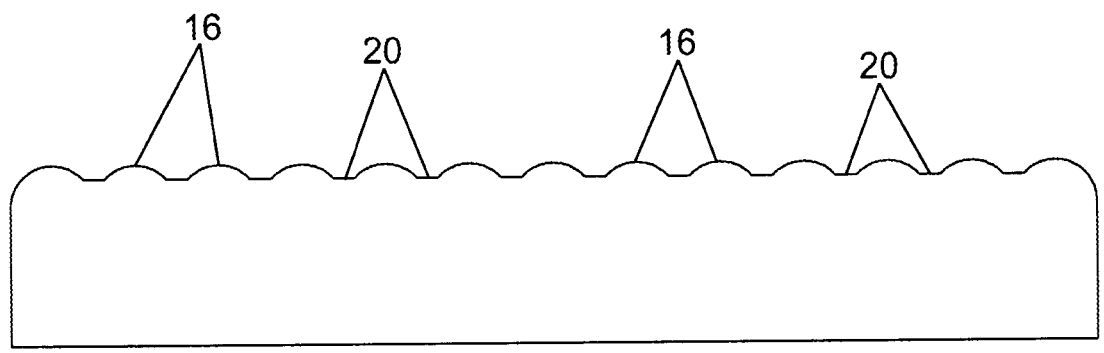
FIG. 2 is a cross-sectional schematic view taken along line 2-2 of FIG. 1.
Figure 3:
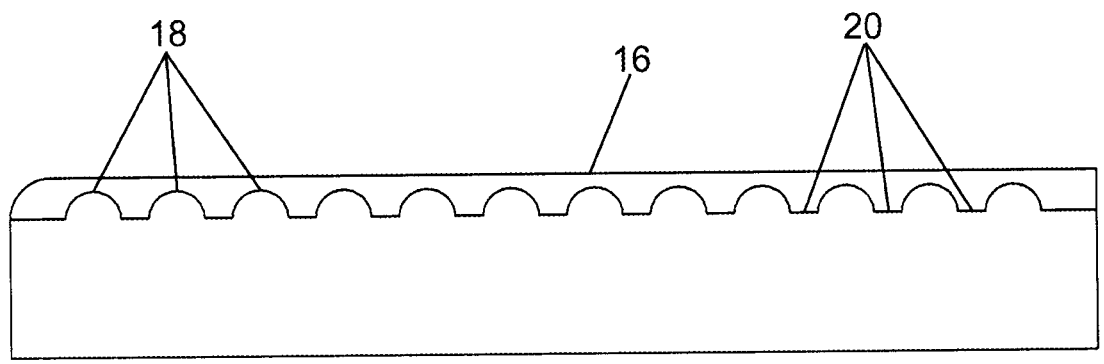
FIG. 3 is a cross-sectional schematic view taken along line 3-3 of FIG. 1.

A cross-sectional view of the capacitor, taken along line 2-2 of FIG. 1 is illustrated schematically in FIG. 2. A cross-sectional view of the capacitor, taken along line 3-3 of FIG. 1 is illustrated schematically in FIG. 3.

Figure 4:
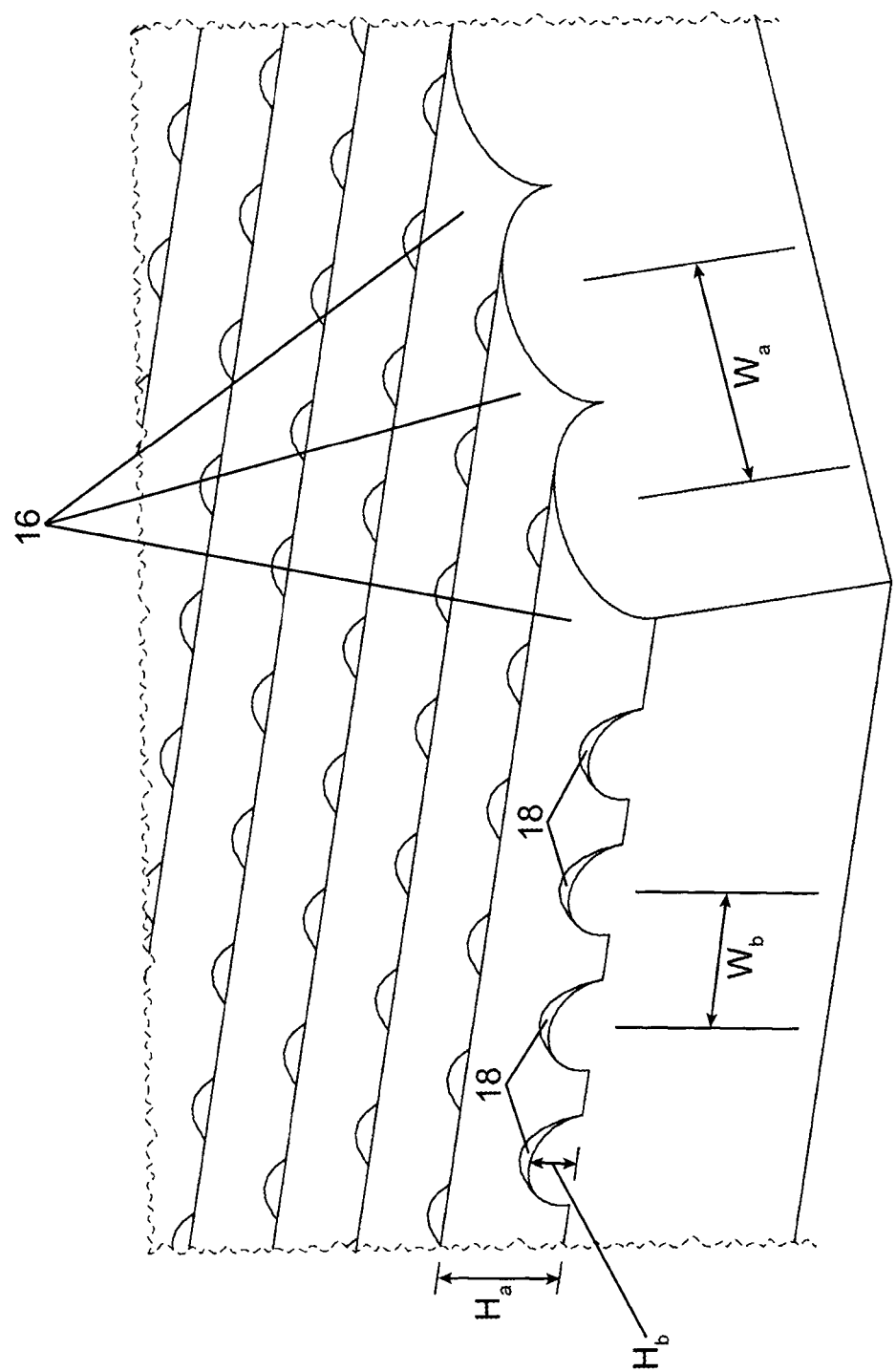
FIG. 4 is a partial schematic view of an embodiment of the invention.

An embodiment of the invention will be described with reference to FIG. 4 wherein a partial section of the micropattern on the capacitor is shown in schematic view. For the purposes of discussion the height and width of the first set of parallel surface protrusions will arbitrarily be referred to as $H_A$ and $W_A$, respectively, and the height and width of the second set of parallel surface protrusions will be referred to as $H_B$ and $W_B$, respectively. The height is the furthest distance from a plane intersecting the surfaces of wells to a plane intersecting the top of protrusions at their highest point away from the center of the anode. The width is the distance between adjacent protrusions at their highest point away from the center of the anode. The height, $H_A$ and $H_B$, of the protrusions are, independently, at least 0.005 mm to no more than 0.045 mm. Below about 0.005 mm the subsequent layers necessary for coating the surface mask the microstructure and therefore the surface functions as a smooth surface with no benefit from the microstructure. Above about 0.045 mm the amount of conductive material required to cover the surface increases and the conductive material in the wells is thicker than on the protrusions and therefore the cathode is not conformal which is detrimental to performance. More preferably, the height of the protrusions is, independently, at least 0.02 mm to no more than 0.03 mm. A particular advantage of the instant invention is that the subsequent layers, specifically carbon containing layers and metal containing layers, can follow the contour of the conductive polymer layer, which preferably follows the contour of the anode, and therefore the micropatterning of the anode is evident on the surface of the capacitor, referred to herein as being conformal, which is advantageous for attachment of the external termination, particularly, by a conductive adhesive, solder or the like.

The width, $W_A$ and $W_B$, is independently a function of the height and preferably the width is $1*H<W\leq7.0*H$ and more preferably $2*H\leq W\leq6*H$ most preferably $4*H\leq W\leq6*H$. A preferred microstructure approximates a sine wave perpendicular to the parallel protrusions. The height and width of the first set of parallel surface protrusions and second set of parallel surface protrusions may be different, however it is preferred that the first set of parallel surface protrusions and second set of parallel surface protrusions have the same dimensions for manufacturing conveniences. While illustrated as a radius, which is preferred for manufacturing convenience, the cross-sectional shape of the protrusions may be any shape suitable for formation by pressing.

Figure 5:
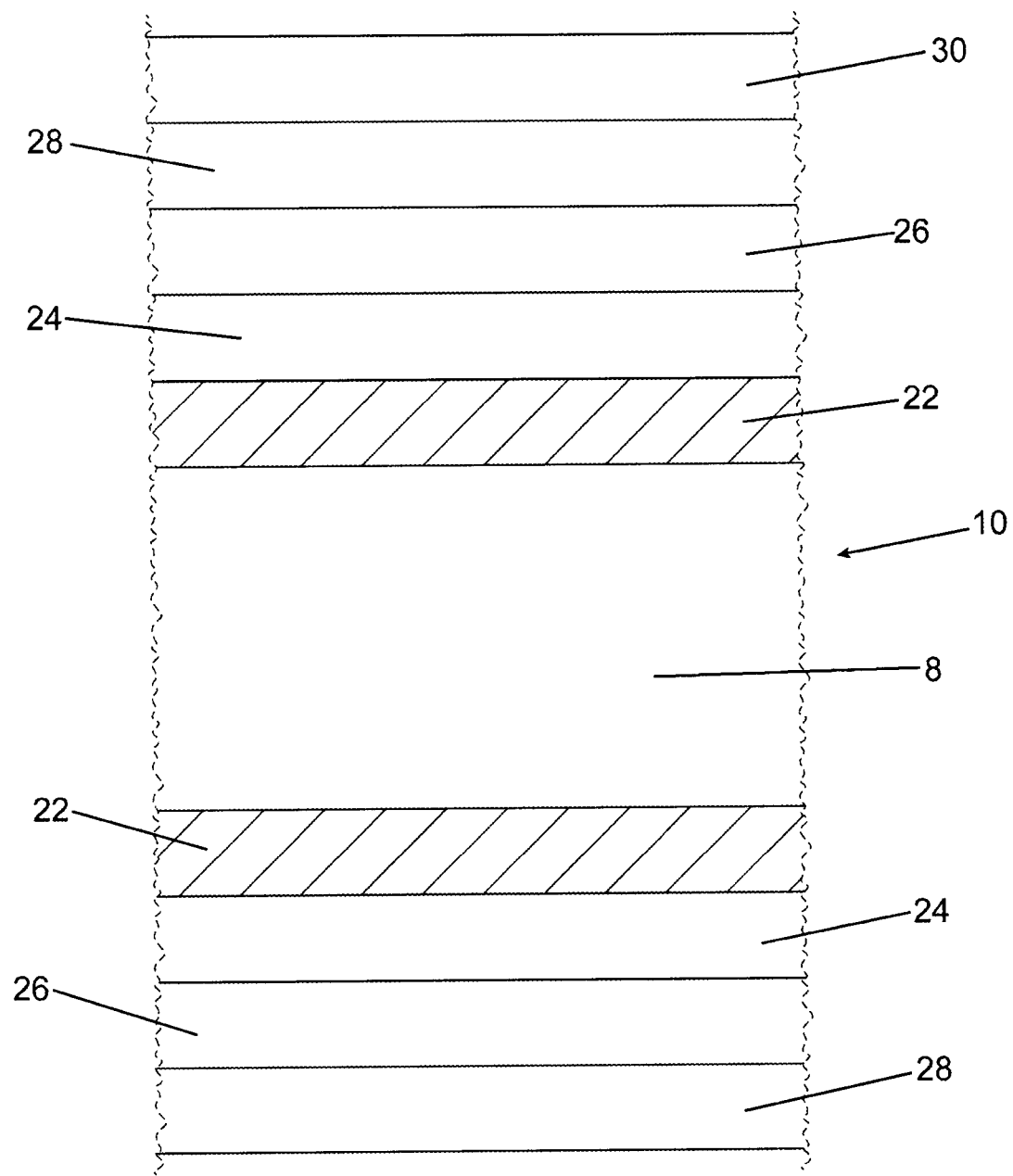
FIG. 5 is a cross-sectional schematic view of an embodiment of the invention.

A partial cross-sectional view of a capacitor is illustrated schematically in FIG. 5. In FIG. 5, the anode, 8, of the capacitor, 10, has a dielectric, 22, formed thereon and preferably the entire anode has a dielectric thereon. A conductive polymer layer, 24, is on the dielectric with the understanding that the conductive polymer layer does not extend beyond the dielectric and therefore the conductive polymer and anode do not come into direct electrical contact. A series of adhesion layers are typically required to insure adhesion to an external termination. The adhesion layers typically include a carbon containing layer, 26, which adheres to the conductive polymer layer, followed by a metal containing layer, 28, which adheres to the carbon containing layer. An optional but preferred external termination, 30, also referred to as a lead or lead frame to those of skill in the art, is in electrical contact with the metal containing layer and typically adhered thereto by a conductive adhesive such as a solder, transient liquid phase adhesive or the like. The conductive polymer layer, carbon containing layer and metal containing layers may be formed by the application of multiple layers.

The formation of the anode is preferably accomplished by pressing a powder of the desirable valve metal into a monolithic body followed by sintering of the monolithic body of pressed powder to form an anode. To achieve the micropatterning on the anode a press is prepared comprising indentations which have the shape and size of the intended surface protrusions. In a preferred embodiment, a suitable set of plates are prepared by forming a first set of indentations with a depth equal to the intended height of the first set of parallel protrusions and a second set of indentations with a depth equal to the intended height of the second set of parallel protrusions wherein the first set of indentations and second set of indentations are not parallel. The indentations are preferably made by interaction of a wire, having a radius equal to the desire radius of the eventual protrusions, wherein the wire removes an area of the plate equivalent to the dimensions of the wire. In one embodiment the depth of the indentation is no more than the radius of the wire. As would be realized, the radius of the wire and radius of the eventual protrusions are approximately equivalent.

With further reference to FIG. 1, the anode has a high aspect ratio defined as the ratio of the equivalent diameter of a major face to the average thickness. The two major faces are parallel to each other and separated by the average thickness. The minor faces are preferably perpendicular to the major faces and preferably each adjacent minor face is perpendicular. The equivalent diameter is the diameter of a circle having the same surface area as the major face. For a rectangle, the surface area is defined as W×L wherein W is width and L is length. The surface area for other shapes could be easily determined. The average thickness is T. More specifically, for a rectangle, the equivalent diameter ($D_E$) can be determined by the equation:

$$D_E = (4 \ast W \ast L / \pi)^{0.5}$$

and the aspect ratio (AR) is defined by the equation:

$$AR = D_E / T.$$

It is preferred that the aspect ratio be over 1 to no more than 10. At an aspect ratio of about 1 the synergistic advantages of the high charge density powder, conductive polymer cathode, and micropattern is not sufficient to justify the modification. Above an aspect ratio of about 10 the anode is easily fractured and becomes difficult to handle in conventional manufacturing equipment. More preferably the aspect ratio is at least 2 to no more than 7 with about 3 to 6 being most preferred.

The average thickness, T, of the anode is preferably at least 0.3 mm to no more than about 4 mm. Below about 0.3 mm the physical integrity of the anode is insufficient and handling in conventional manufacturing environments results in extreme yield loss due to breakage. Above about 4 mm the capacitive volume, or capacitance as a function of volume, for the eventual capacitor degrades and therefore the advantages offered by the instant invention are not realized. It is more preferable that the anode have a thickness of no more than 1 mm.

The anode preferably comprises a valve metal or conductive oxide of the valve metal with particularly preferred anode materials being selected from aluminum, tantalum and niobium with tantalum being most preferred. The anode has a dielectric thereon, which is preferably an oxide of the anode metal. A cathode is on the dielectric wherein the cathode is preferably a conductive polymer and most preferably a conductive thiophene such as poly(3,4-polyethylene dioxythiophene) (PEDT) or derivatives thereof. Dielectric formation and the formation of a cathode from conductive polymer is well known to those of skill in the art and further elaboration herein is not necessary.

The anode powder has a charge density of at least 200,000 μFV/g, more preferably at least 300,000 μFV/g, more preferably at least 400,000 μFV/g and most preferably at least 500,000 μFV/g as determined for tantalum or for a valve metal other than tantalum, such as niobium, a powder having an equivalent surface area to tantalum having the preferred capacitive density.

Figure 6:
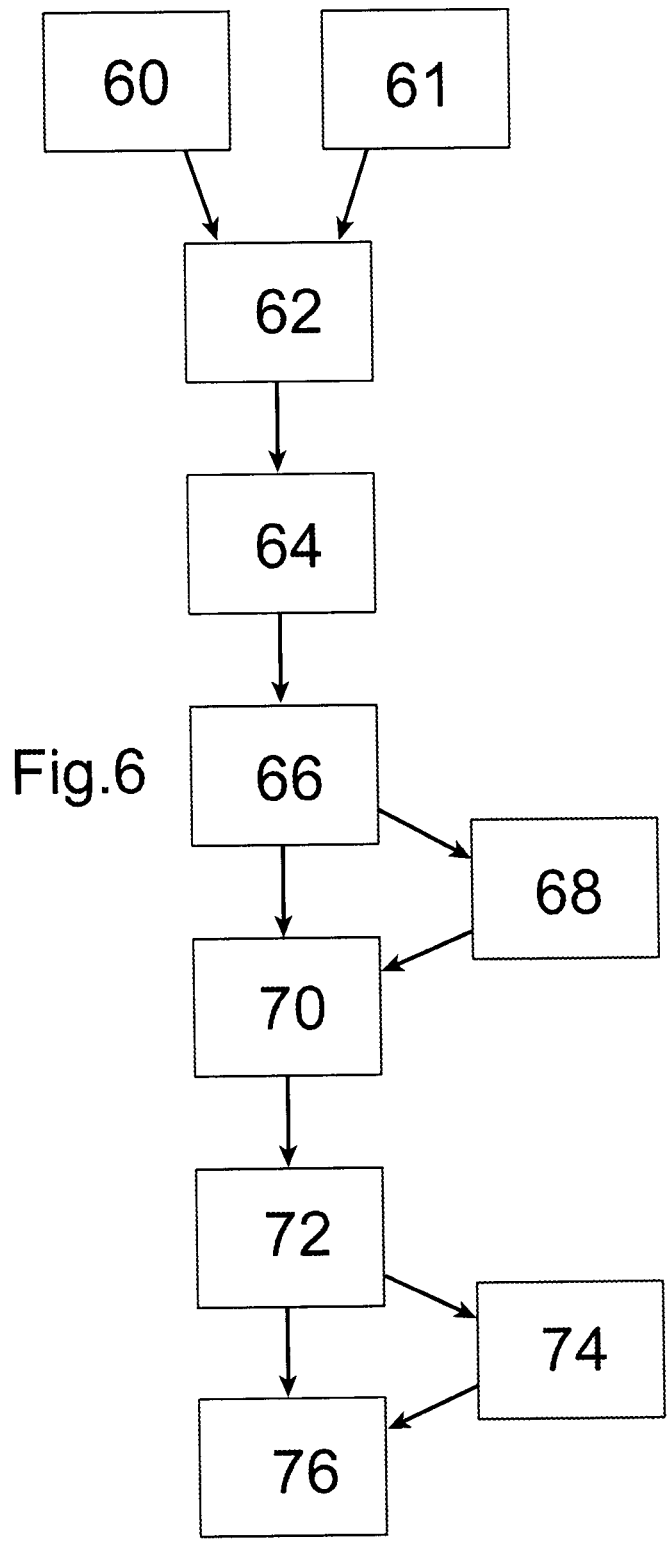
FIG. 6 is a flow chart representation of an embodiment of the invention.

The formation of a capacitor will be described with reference to FIG. 6. A press comprising plates with indentations suitable for forming the desired micropattern is charged with a high charge density powder and the powder is pressed, at 60, forming a monolithic body. The pressing of a powder to form a monolith is well known to those of skill in the art and not altered herein except for the use of a press having a micropatterned surface as discussed herein. Additives and additional components can be added to the powder as well known to those of skill in the art with binders and/or lubricants being understood to be advantageous and their use is not altered by the invention described herein.

In another embodiment, the monolith can be formed, at 61, by alternate techniques such as 3-D printing of a ceramic precursor, screen printing techniques, casting techniques and the like or combinations thereof. With 3-D printing of ceramic precursors it is known in the art to include additives to improve the thixotropic properties of the ceramic precursor.

The monolith is sintered at 62 to form an anode. The anode is anodized, at 64, to form a dielectric on the surface of the anode wherein the dielectric is preferably an oxide of the valve metal. Anodization is well known in the art and the method of anodizing is not particularly limited herein. Other dielectrics could be incorporated without departing from the scope of the invention but oxides of the anode are widely used in the art and preferable for manufacturing conveniences.

In an embodiment the anode can be prepared by multiple steps including combinations of pressing, 3-D printing and screen printing. A portion of the anode can be formed by pressing a powder, with or without the protrusions present, to form a primary monolith. The size, preferably just thickness, of the primary monolith can then be increased by 3-D printing additional material onto the primary monolith or by screen printing a pattern either of which can form the protrusions discussed elsewhere herein. The primary monolith can be sintered prior to adding additional material or the monolith may be formed to the intended size and shape and the completed monolith sintered.

A cathode layer is formed on the dielectric at 66. The cathode is a conductive layer and may be formed from conductive polymers, such as conductive thiophenes with poly(3,4-ethylenedioxythiophene) (PEDT) or derivatives thereof being exemplary for use in demonstrating the invention. PEDT is commercially available as a slurry with suitable counterions. Monomers and oxidants are also commercially available for formation of PEDT in-situ as well known to those of skill in the art. The cathode is formed by coating, in-situ polymerization, screen printing, 3-D printing, other techniques as known to those of skill in the art or combinations thereof.

In an embodiment the cathode can be formed by the sequential formation of sublayers with each sublayer being independently formed by coating, 3-D printing, or screen printing with optional drying and/or curing of individual sublayers prior to subsequent sublayer formation or by curing the assembly of formed layers. The protrusions may be formed in one or more of the sequential layers.

In one embodiment the conductive cathode layer can be micropatterned after formation of the coating at 68 to form the first set of parallel surface protrusions and second set of parallel surface protrusions. It is preferable that the conductive cathode layer micropattern be similar, and preferable the same, as the micropattern described herein for the anode for manufacturing convenience.

It is widely understood that external terminations are difficult to form on the cathode, particularly with a conductive polymeric cathode, and additional layers are typically included to facilitate termination. In particular, carbon containing layers, formed at 70, are overcoated with metal layers, at 72. Silver or nickel are suitable for demonstration of the invention without limit thereto. Carbon containing layers and metal containing layers are formed by coating and/or electroplating as well known to those of skill in the art. The formation of the carbon containing layers and metal containing layers is not altered by the invention.

In one embodiment the carbon and/or metal containing layers can be micropatterned after formation of the coatings at 74. It is preferable that the carbon and/or metal containing layers micropattern be similar, and preferable the same, as the micropattern described herein for the anode for manufacturing convenience.

The capacitor is typically finished at 76 which may include attachment of external anode terminations in electrical contact with the anode wire, external cathode terminations in electrical contact with the cathode, encapsulating in an insulator, testing, packaging and the like. The external terminations are well known and not altered by the invention.

EXAMPLES

Example 1

Figure 7:
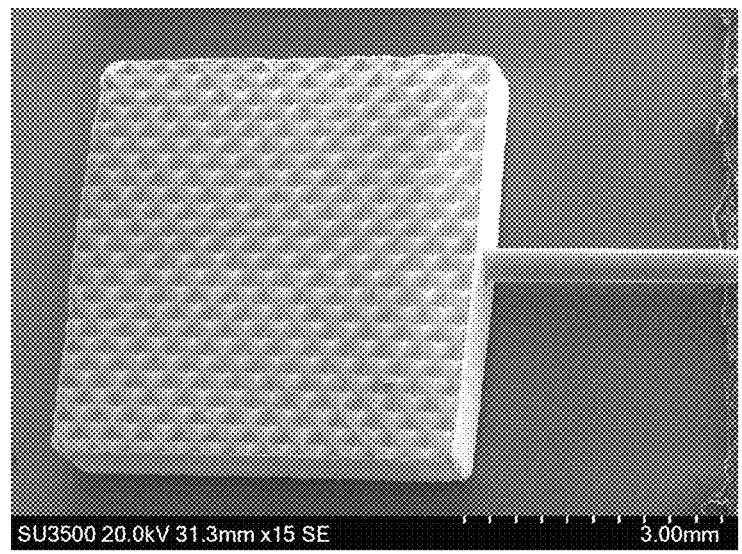
FIG. 7 is a photographic representation of an inventive anode.
Figure 8:
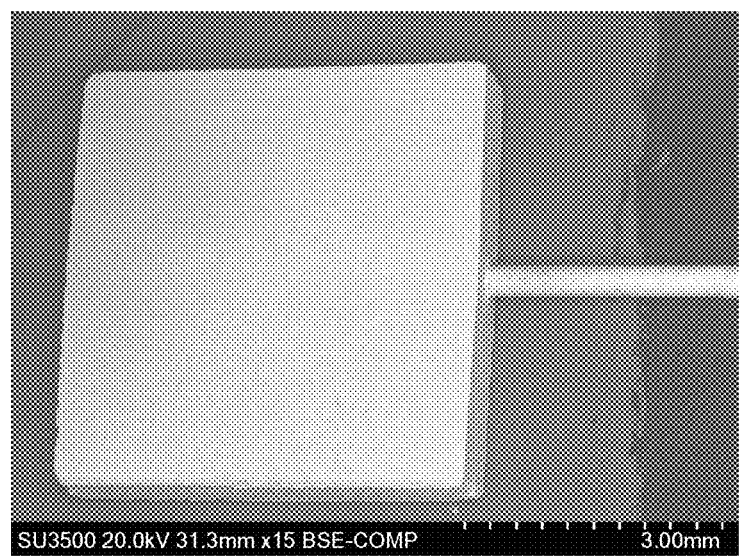
FIG. 8 is a photographic representation of a comparative anode.

A series of H case size anodes having dimensions of 5.08 mm (0.200") wide, 4.978 mm (0.196") long and 0.9652 mm (0.038") thick were prepared with anode wires having a diameter of 0.381 mm (0.015") extending therefrom. The anodes were prepared using 200,000 CV/g Ta powder (STA 200K from HC Starck) with a specially fabricated press die into a monolithic body followed by sintering of the monolithic body of pressed powder to form an anode. To achieve the micropatterning on the anode the specially fabricated press was prepared comprising indentations having the shape and size of the intended surface protrusions. A suitable set of plates were prepared by forming a first set of indentations with a depth equal to the intended height of the first set of parallel protrusions and a second set of indentations with a depth equal to the intended height of the second set of parallel protrusions wherein the first set of indentations and second set of indentations were approximately perpendicular. The indentations were made by interaction of a wire, having a radius equal to the desired radius of the eventual protrusions, wherein the wire removes an area of the plate equivalent to the dimensions of the wire. A photograph of a representative inventive anode is provided in FIG. 7 and a photograph of a representative comparative anode is provided in FIG. 8.

Example 2

A series of tantalum anodes were prepared identical to Example 1 without micropatterning. The sintered anodes from both micropatterned and non micropatterned groups were anodized at 14V using phosphoric acid electrolyte to form a dielectric on the tantalum anode. The anodized anodes thus formed were dipped into a solution of iron (III) toluenesulfonate oxidant for 1 minute and sequentially dipped into ethyldioxythiophene monomer for 1 minute. The coated anodized anodes were washed to remove excess monomer and by-products of the reactions after the completion of 60 minutes polymerization, which formed a thin layer of conductive polymer (PEDOT) on the dielectric of the anodes. This process was repeated several times. The anodes were washed, and a conventional graphite coating was applied followed by a conventional silver layer. The silvered anodes were tested for capacitance, dissipation factor, and equivalent series resistance before and after exposure to multiple reflow passes at a temperature of 260°. The results are presented in Table 1.

TABLE 1

|  | Reflow 1 | Reflow 4 | Reflow 6 | % change (reflow 6-relow 1) |
|---|---|---|---|---|
| Capacitance (microfarad) | | | | |
| Example 2 | 1515 | 1477 | 1432 | 5 |
| Example 1 | 1423 | 1414 | 1401 | 2 |
| Dissipation Factor (%) | | | | |
| Example 2 | 6.6 | 11.0 | 16.6 | 152 |
| Example 1 | 5.1 | 6.5 | 9.0 | 77 |
| Equivalent Series Resistance (ESR, milliohm) | | | | |
| Example 2 | 30.5 | 43.3 | 54.9 | 80 |
| Example 1 | 24.5 | 29.7 | 35.3 | 44 |

Example 3

A series of anodes were prepared as in Examples 1 and 2 using 250,000 CV/g Ta powder (S25 MB GAM). Inventive anodes, having micropatterns, and comparative anodes, without micropatterns, were prepared as in Examples 1 and 2. The sintered anodes from both micropatterned and non-micropatterned groups were anodized at 14 V using phosphoric acid electrolyte to form a dielectric on the tantalum anode. Wet capacitance of the anodes were measured after formation at 14V.

The anodized anodes thus formed were dipped into a solution of iron (III) toluenesulfonate oxidant for 1 minute and sequentially dipped into ethyldioxythiophene monomer for 1 minute. The coated anodized anodes were washed to remove excess monomer and by-products of the reactions after the completion of 60 minutes polymerization, which formed a thin layer of conductive polymer (PEDOT) on the dielectric of the anodes. This process was repeated several times. The anodes were washed, and a conventional graphite coating was applied followed by a conventional silver layer. The silvered anodes were tested for capacitance, dissipation factor, and equivalent series resistance before and after exposure to multiple reflow passes at a temperature of 260°. The results are presented in Table 2.

TABLE 2

| Example 3 | Reflow 1 | Reflow 4 | Reflow 6 | % change (reflow 6-relow 1) |
|---|---|---|---|---|
| | Capacitance (microfarad) | | | |
| Comparative | 1322 | 1261 | 1207 | 8.7 |
| Inventive | 1453 | 1446 | 1417 | 2.4 |

Example 4

A series of anodes were prepared as in Examples 1 and 2. Finished capacitors were formed from using the anodes and the finished capacitors were mounted for testing. The testing results are provided in Table 3.

TABLE 3

| | Post molded ESR (mohm) | Post mounted ESR (mohm) | Post BHAST ESR (mohm) |
|---|---|---|---|
| Example 4 micropatterned | 24.79 | 25.54 | 25.9 |
| Example 4 Non-micropatterned | 27.91 | 35.79 | 36.06 |

Example 5

A series of anodes were prepared as in Example 3 in different experiments. The sintered anodes from both micropatterned, inventive, and non-micropatterned, comparative, groups were anodized at 14 V using phosphoric acid electrolyte to form a dielectric on the tantalum anode. The parts were assembled, molded and mounted and mounted for testing. The results are provided in Table 4.

TABLE 4

| Example 5 | Post mounted Capacitance (microfarad) |
|---|---|
| Inventive (micropatterned) | 1454 |
| Comparative | 1337 |

Example 6

A series of anodes were prepared as in Example 3 in different experiments. The sintered anodes from both micropatterned, inventive, and non-micropatterned, comparative, groups were anodized at 14 V using phosphoric acid electrolyte to form a dielectric on the tantalum anode. The anodized anodes thus formed were dipped into a solution of iron (III) toluenesulfonate oxidant for 1 minute and sequentially dipped into ethyldioxythiophene monomer for 1 minute. The coated anodized anodes were washed to remove excess monomer and by-products of the reactions after the completion of 60 minutes polymerization, which formed a thin layer of conductive polymer (PEDOT) on the dielectric of the anodes. This process was repeated several times. A commercial conductive polymer dispersion (Clevios KV2) was applied to form a thick external polymer layer. After drying, alternating layers of decanediamine, toluenesulfonate and dispersion (Clevios KV2) were applied and repeated 4 more times. The treatment and testing was then the same as Comparative Example 1. The anodes were washed, and a conventional graphite coating was applied followed by a conventional silver layer. The parts were assembled, molded and mounted. The parts were assembled, molded and mounted and mounted for testing. The results are provided in Table 5.

TABLE 5

| Example 6 | Post mounted Capacitance (microfarad) |
|---|---|
| Inventive (micropatterned) | 1345 |
| Comparative | 1213 |

The invention has been described with reference to the preferred embodiments without limit thereto. One of skill in the art would realize additional embodiments and improvements which are not specifically stated herein but which are within the scope of the invention as set forth in the claims appended hereto.

The invention claimed is:

1. A capacitor comprising:
    an anode comprising a pressed and sintered valve metal powder wherein said anode has edge surfaces and parallel major surfaces wherein said anode further comprises a first set of parallel surface protrusions and a second set of parallel surface protrusions on each parallel major surface of said parallel major surfaces wherein said first set of parallel surface protrusions and said second set of parallel surface protrusions are not parallel to each other and form a well therebetween;
    an anode wire extending from an edge surface of said edge surfaces;
    a dielectric on said anode; and
    a conductive polymer on said dielectric.

2. The capacitor of claim 1 wherein said valve metal powder is a tantalum powder.

3. The capacitor of claim 2 wherein said tantalum powder has a charge density of at least 200,000 μFV/g.

4. The capacitor of claim 3 wherein said tantalum powder has a charge density of over 300,000 μFV/g.

5. The capacitor of claim 4 wherein said tantalum powder has a charge density of over 400,000 μFV/g.

6. The capacitor of claim 5 wherein said tantalum powder has a charge density of over 500,000 μFV/g.

7. The capacitor of claim 1 wherein said first set of parallel surface protrusions and said second set of parallel surface protrusions are at an angle of at least 25° to no more than 90° relative to each other.

8. The capacitor of claim 1 wherein said first set of parallel surface protrusions and said second set of parallel surface protrusions independently have a height of at least 0.005 mm to no more than 0.45 mm.

9. The capacitor of claim 8 wherein said height is at least 0.02 mm to no more than 0.03 mm.

10. The capacitor of claim 1 wherein said first set of parallel surface protrusions and said second set of parallel surface protrusions independently independently have a width, (W) wherein said width is defined by the equation $1*H<W\leq7.0*H$.

11. The capacitor of claim 10 wherein width is defined by the equation $2*H\leq W\leq6*H$.

12. The capacitor of claim 11 wherein said width is defined by the equation $4*H\leq W\leq6*H$.

13. The capacitor of claim 1 wherein said anode has an aspect ratio of at least 1 to no more than 10.

14. The capacitor of claim 13 wherein said aspect ratio is at least 2 to no more than 7.

15. The capacitor of claim 14 wherein said aspect ratio is at least 3 to no more than 6.

16. The capacitor of claim 1 wherein said anode has an average thickness of at least 0.3 to no more than about 4 mm.

17. The capacitor of claim 16 wherein said average thickness is no more 1 mm.

18. The capacitor of claim 1 wherein said conductive polymer comprises a thiophene.

19. The capacitor of claim 18 wherein said thiophene is poly(3,4-ethylenedioxythiophene).

20. The capacitor of claim 1 further comprising a carbon containing layer on said conductive polymer.

21. The capacitor of claim 20 further comprising a metal containing layer on said carbon containing layer.

22. The capacitor of claim 1 further comprising at least one of an anode external termination or a cathode external termination.

23. A capacitor comprising:
an anode comprising a pressed and sintered valve metal powder;
a dielectric on said anode;
a conductive polymer on said dielectric;
wherein said capacitor has edge surfaces and parallel major surfaces wherein said capacitor further comprises a first set of parallel surface protrusions and a second set of parallel surface protrusions on each parallel major surface of said parallel major surfaces wherein said first set of parallel surface protrusions and said second set of parallel surface protrusions are not parallel and form a well therebetween; and
an anode wire extending from an edge surface of said edge surfaces.

24. A method for forming a capacitor comprising:
forming a monolith of a valve metal comprising parallel major surfaces and edge surfaces with an anode wire extending from an edge surface of said edge surfaces wherein said monolith further comprises a first set of parallel surface protrusions and a second set of parallel surface protrusions on each parallel major surface of said parallel major surfaces wherein said first set of parallel surface protrusions and said second set of parallel surface protrusions are not parallel and form a well therebetween;
sintering said monolith to form an anode;
forming a dielectric on said anode; and
forming a conductive polymer layer on said dielectric.

25. A method for forming a capacitor comprising:
charging a press with a valve metal powder;
pressing said valve metal powder to from a monolith;
sintering said monolith to form an anode;
forming a dielectric on said anode;
forming a conductive polymer layer on said dielectric; and
forming a first set of parallel surface protrusions and a second set of parallel surface protrusions on parallel major surfaces of said conductive polymer layer wherein said first set of parallel surface protrusions and said second set of parallel surface protrusions are not parallel and form a well therebetween.

* * * * *